(12) United States Patent
Guha et al.

(10) Patent No.: US 9,047,528 B1
(45) Date of Patent: Jun. 2, 2015

(54) IDENTIFYING CHARACTERS IN GRID-BASED TEXT

(71) Applicants: Shataneek Guha, Tamil Nadu (IN); Prannoy Vargis C, Kerala (IN); Adarsh Natarajan, Kerala (IN)

(72) Inventors: Shataneek Guha, Tamil Nadu (IN); Prannoy Vargis C, Kerala (IN); Adarsh Natarajan, Kerala (IN)

(73) Assignee: Amazon Technologies, Inc., Reno, NV (US)

(*) Notice: Subject to any disclaimer, the term of this patent is extended or adjusted under 35 U.S.C. 154(b) by 116 days.

(21) Appl. No.: 13/770,753

(22) Filed: Feb. 19, 2013

(51) Int. Cl.
*G06K 9/18* (2006.01)
*G06K 9/34* (2006.01)
*G06K 9/36* (2006.01)

(52) U.S. Cl.
CPC .......................................... *G06K 9/18* (2013.01)

(58) Field of Classification Search
CPC ............... G06K 9/00463; G06K 9/18; G06K 2209/011; G06K 2209/013; G06K 9/00865; G06K 9/00979; G06K 9/3208; G06K 9/6206; G06K 9/66; G06K 9/325; G06K 9/4638; G06F 12/0246; G06T 2207/10008; G06T 2207/30176; G06T 5/002; G06T 5/006
USPC ......... 382/182, 186, 185, 187, 175, 176, 177, 382/107, 159, 209, 220, 274, 276, 303, 382/302; 348/468, E7.033; 358/465, 498
See application file for complete search history.

(56) References Cited

U.S. PATENT DOCUMENTS

| | | | | |
|---|---|---|---|---|
| 6,038,342 | A  * | 3/2000  | Bernzott et al. | 382/173 |
| 6,173,073 | B1 * | 1/2001  | Wang | 382/176 |
| 6,542,635 | B1 * | 4/2003  | Hu et al. | 382/173 |
| 7,286,718 | B2 * | 10/2007 | Aradhye | 382/290 |
| 7,437,023 | B2 * | 10/2008 | King et al. | 382/305 |
| 8,335,402 | B1 * | 12/2012 | Manmatha et al. | 382/283 |
| 8,515,176 | B1 * | 8/2013  | Sankaranarayanan et al. | 382/185 |
| 8,611,662 | B2 * | 12/2013 | Tsai et al. | 382/176 |
| 8,615,129 | B2 * | 12/2013 | Suwa | 382/162 |
| 2007/0201757 | A1 * | 8/2007 | Madej et al. | 382/254 |

* cited by examiner

*Primary Examiner* — Sheela Chawan
(74) *Attorney, Agent, or Firm* — Lowenstein Sandler LLP (57) ABSTRACT

A method for identifying characters in scanned images of objects includes identifying a first set of characters in a scanned image of an object based on connected component analysis, identifying a second set of characters for the object based on an optical character recognition (OCR) process on the image of the object, and combining the first set of characters with the second set of characters to create a third set of characters.

17 Claims, 7 Drawing Sheets

IDENTIFYING CHARACTERS IN GRID-BASED TEXT

BACKGROUND

Text is the representation of written language. Printed text can be processed, for example, using optical character recognition (OCR). OCR is the electronic conversion of scanned images into machine-encoded text. The converted machine-encoded text may then be electronically searched and/or used in various machine processes, such as text mining, machine translation, etc. When running an OCR application on a scanned image, boundary information for the text is created. In character recognition, boundaries can be a real or imaginary rectangle which serves as the delimiter between consecutive letters, numbers, and/or symbols in characters (e.g., Chinese or Japanese characters). The boundary information can include the rectangular coordinates for the lines that make up Chinese or Japanese characters.

Typically, when a scanned image is of poor quality or if the scanned image contains logographic characters (e.g., Japanese or Chinese characters), the OCR application may make mistakes in detecting the boundaries, and applications and processes, which may rely on the boundary information, may generate incorrect results. For example, portions of the same character may be treated as separate characters or separate characters can be treated as portions of the same character, causing typographical and grammatical errors. Editors may spend a significant amount of time trying to detect and correct the errors.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Described herein are methods, systems, and non-transitory computer-readable storage media for identifying characters in text based on improved accuracy of optical character recognition (OCR) boundary detection. Characters may include letters, numbers, and/or symbols. Text may be grid-based text that uses base characters of the same size. Examples of grid-based text include Japanese, Chinese and Korean text. In grid-based text, a character may be also referred to as a word. Embodiments of the present disclosure can also be applicable to non-grid based text including, for example, text in Latin-based languages, text in Cyrillic-based languages, etc.

Incorrect OCR boundary information may result in broken characters (when portions of the same character are treated as separate characters) or incorrectly merged characters (when separate characters are treated as portions of the same character). OCR boundary information is also hereinafter referred to as "bounding boxes" or "bounds." The bounds can include the rectangular coordinates for the lines in the characters.

Embodiments of the present disclosure can identify elements connected by ink and treat the connected elements as a single word, thereby addressing the above OCR problem with broken words and incorrectly merged characters. In addition, there may be cases in which disjoint elements should be treated as a single character (e.g., an accent indicator on top of a base character or a dot on top of "i" or "j"). In such cases, embodiments of the present disclosure can use grid layout analysis to determine which disjoint elements should be combined into a single character.

Figure 1:
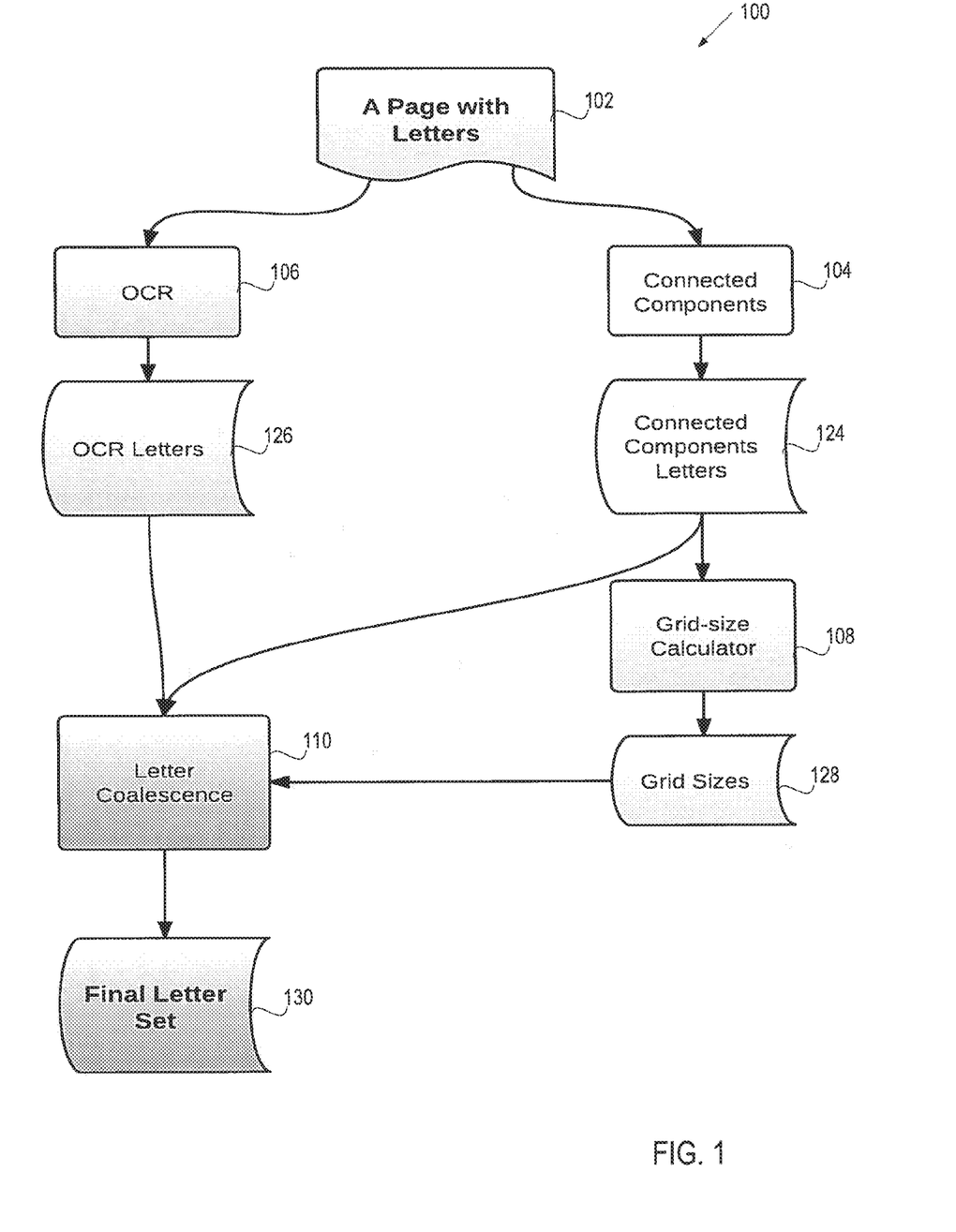
FIG. 1 illustrates operation of an example character identifying subsystem in accordance with some embodiments of the present disclosure.

FIG. 1 illustrates operation of an example character identifying subsystem 100 in accordance with some embodiments of the present disclosure. The character identifying subsystem 100 can convert a printed publication into an electronic work. Examples of electronic works include, and are not limited to, electronic books (e-books), electronic magazines, electronic newspapers, electronic journals, electronic comic books, etc. An electronic work may include a single work or a collection of works. For example, an electronic work may include a single book, or an anthology.

The character identifying subsystem 100 may process a page image 102 of each page of the printed publication using an OCR subsystem 106 and a connected component subsystem 104. An image of the page may be created using a scanner or any similar device capable of capturing images including but not limited to a video camera, digital camera, copier, scanning pen, etc. The OCR subsystem 106 creates an electronic OCR letters file 126. The OCR subsystem 106 may be any type of computing device or multiple computing devices, such as a desktop computer system, a server, a supercomputer, a notebook computer, a tablet computer, an eBook reader, a smart phone, and the like. The OCR subsystem 106 can include software modules, hardware modules, or a combination thereof. For example, the OCR subsystem 106 may analyze sequential lines and curves and make "best guesses" at characters using look-up tables to convert the page image 102 into machine-encoded text. The OCR letters file 126 includes a set of characters (an OCR set of characters) identified in the page image 102 and OCR boundary information ("bounds") that specifies the rectangular coordinates for the lines in the characters. The OCR letters file 126 can be an xml file or any other type of file.

The connected components subsystem 104 identifies a set of characters in the page image 102 using connected component analysis. The connected components subsystem 104 may perform connected analysis by analyzing every pixel in the scanned image and determining whether the pixel is connected to any other adjacent pixel in any of 4 directions (to the left, to the right, above and below the current pixel). The connected components subsystem 104 defines each subset of connected pixels using a respective bounding box, and stores the resulting set of characters (a CC set of characters) in a connected components (CC) letters file 124. The CC letters file 124 can also include bounds of the resulting characters. The above connections via pixels in the image, when viewed by a user, resemble elements connected by ink in manually written text. As such, the above connections via pixels are also referred to herein as connections by ink.

The character identifying subsystem 100 may also include a grid-size calculator 108 that determines sizes of characters in the CC letters file 124. In one embodiment, the grid-size calculator 108 estimates a size of characters in a paragraph by determining a distance between centers of each pair of successive characters in the paragraph, storing calculated distances in a histogram, and calculating a median value of the peaks in the histogram. In one implementation, the histogram is created using bins that represent different distances or different predefined ranges of distances (e.g., 0-0.5 millimeter, 0.5-1 millimeter, 1-1.5 millimeters, 1.5-2 millimeters, 2-2.5 millimeters, etc.). A distance between centers of each pair of successive characters in the paragraph is stored in a corresponding bin of the histogram. Each peak in the histogram represents a frequency of occurrence of distance values that fall within a corresponding distance range. The median value of the distance values that fall within the distance ranges associated with the peaks in the histogram represents a median character size in the paragraph. Resulting character sizes of various paragraphs can be stored in a temporary data store (e.g., a buffer) or a persistent data store (e.g., a file or a table).

Text in grid-based languages can have paragraphs with vertical text or horizontal text. The grid-size calculator 108 can analyze character positions to determine whether the text is vertical or horizontal, and use the direction of the orientation of the text in the paragraph to determine distances between characters. It should be noted that various other mechanisms can be used to determine grid layout properties. For example, rather than determining a median character size for a paragraph, the grid-size calculator 108 can determine an average character size by adding distances between characters in the paragraph and dividing the total by the number of characters in the paragraph. Yet alternatively, the grid-based calculator 108 can determine a minimum and a maximum character size for each paragraph (e.g., for text in a Latin-based language).

The character identifying subsystem 100 may also include a letter coalescence subsystem 110 that merges characters in the OCR character set with characters in the CC character set using one or more merging criteria pertaining to grid layout. The letter coalescence subsystem 110 can perform merging by first finding characters in the OCR character set that fall inside connected-component characters in the CC character set using, for example, bounding information included in each of these files. For example, the OCR subsystem 106 identifies a component as a character if the component has its own bounding box. As a result, the OCR character set can include components that are classified as characters even though they are character parts (broken characters) rather that individual characters. The letter coalescence subsystem 110 uses the CC character set created by the components subsystem 104 to correct the broken character errors in the OCR character set. In one implementation, the letter coalescence subsystem 110 maps the components from the OCR character set to the components in the CC character set using bounding information (component coordinates provided as part of bounding boxes) in both sets. Then, the letter coalescence subsystem 110 can determine, for each component in the OCR character set, whether this component is located inside of a mapped component in the CC character set (e.g., if the bounding box of the component in the OCR character set is located inside of a larger bounding box of a mapped component in the CC character set). If so, then the component from the OCR character set was likely misclassified as a character by the OCR subsystem 106 and is just a part of another character. The letter coalescence subsystem 110 can then remove the misclassified character parts from the OCR character set. By removing the above characters, the letter coalescence subsystem 110 addresses a deficiency of the OCR subsystem 106 that results in splitting connected by ink elements of a single character into multiple characters.

Next, the letter coalescence subsystem 110 merges characters in the reduced OCR character set and the CC character set into a final letter set 130. In one embodiment, the letter coalescence subsystem 110 can perform merging by determining, based on one or more merging criteria, whether adjacent characters in the reduced OCR character set and the CC character set can be merged into a single character. In one example, the merging criterion may include a first predetermined fraction of an estimated character size (e.g., a character size estimated for a specific paragraph by the grid-size calculator 108 as discussed above), and/or a second predetermined fraction of an estimated character size. In one implementation, the letter coalescence subsystem 110 can perform merging by first mapping components in the reduced OCR character set to components in the CC character set based on their bound information. Next, the letter coalescence subsystem 110 adds, to the final letter set 130, each component in the reduced OCR character set that matches e.g., exactly or closely) a component in the CC character set, and also adds, to the final letter set 130, the components from the reduced OCR character set and the CC character set that do not have a match in the other set. Further, the letter coalescence subsystem 110 combines any 2 adjacent components in the final letter set 130 into a single character if the distance between the 2 components is below a first fraction (e.g., 0.6) of the character size for a corresponding paragraph in the page, and/or the size of the resulting combined character is below a second fraction (e.g., 0.9) of the character size. The letter coalescence subsystem 110 can perform the combining operation iteratively adding a next adjacent component to the resulting combined character until the above conditions are no longer satisfied.

Subset merging can be performed separately for individual paragraphs and the distance measures can be made in the direction of the text orientation of the paragraph being processed. The use of the merging criteria allows the letter coalescence subsystem 110 to address a deficiency of the OCR subsystem 106 that results in splitting disjoint elements of a single character into multiple characters (e.g., a dot on top of "i" or "j").

When the letter coalescence subsystem 110 completes the merging of the characters from the OCR letters file 126 and the characters from the CC letters file 124, it creates an electronic document that includes a final character set 130 that results from the merging. In other embodiments, the grid-size calculator 108 is not used (e.g., for non-grid based text). Rather, the letter coalescence subsystem 110 creates a final character set 130 by merely removing, from the OCR letters file 126, characters that fall inside connected-component characters in the CC letters file 124 using, for example, bounding information included in each of these files.

In some embodiments, the letter coalescence subsystem 110 determines the bounds of the characters in the final letter set 130 and provides the bounds information to the OCR subsystem 106. The OCR subsystem 106 can then perform a second OCR pass on the page image 102 using the new bounds information as additional hints for the correct bounds. Because the new bounds are more accurate than the bounds produced by the OCR subsystem 106 during the first OCR pass, the results of the second OCR pass provide a significant improvement over the results of the first OCR pass.

Figure 2:
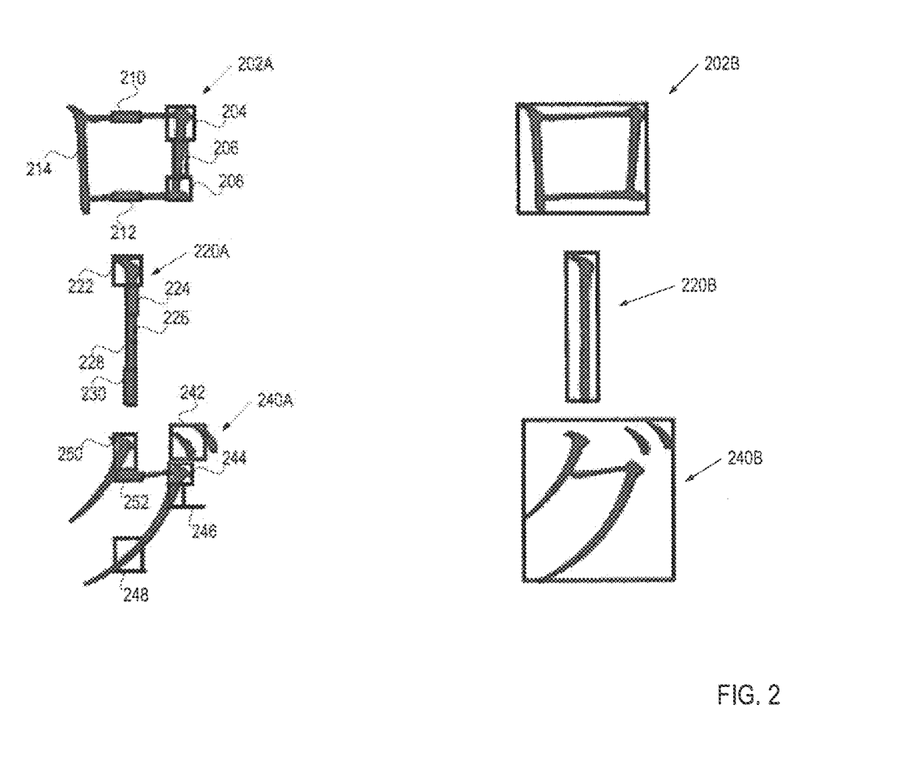
FIG. 2 illustrates examples of improved OCR bound detection in accordance with some embodiments of the present disclosure.

FIG. 2 illustrates examples of improved OCR bound detection in accordance with some embodiments of the present disclosure. Example 202A shows how an OCR subsystem can break a single character into several characters as illustrated by bounding boxes 204, 206, 208, 210 and 212. The OCR subsystem has also missed a left portion 214 of the character. Example 202B illustrates an improved OCR bounds accuracy achieved by embodiments of the present disclosure. As illustrated, a single character 202B is produced with a correct bounding box.

Example 220A also shows how an OCR subsystem can break a single character into several characters as illustrated by bounding boxes 222, 2224, 226, 228 and 230. Example 220B illustrates an improved OCR bounds accuracy achieved by embodiments of the present disclosure. As illustrated, a single character 220B is produced with a correct bounding box.

Example 240A shows how an OCR subsystem can break a single character into several characters corresponding to elements connected by ink and disjoint elements. Bounding boxes 250, 252, 244, 246 and 248 separate elements connected by ink into different characters, and bounding box 242 separates a disjoint accent indicator into a separate character. Example 240B illustrates an improved OCR bounds accuracy achieved by embodiments of the present disclosure. As illustrated, a character 240B is produced with a correct bounding box.

Figure 3:
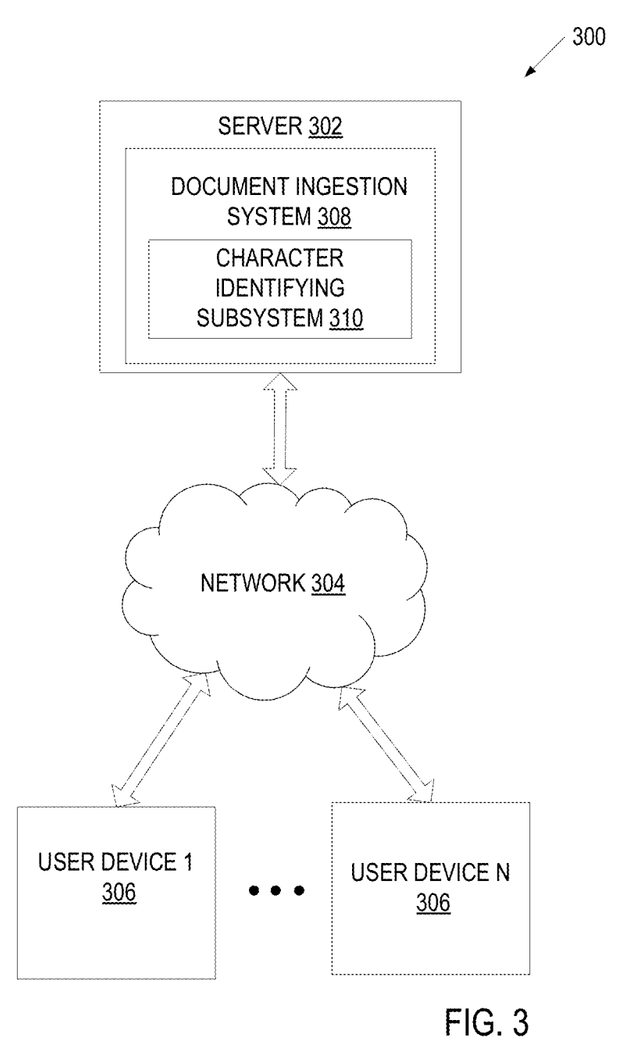
FIG. 3 illustrates an example network architecture in which embodiments of the present disclosure can operate.

FIG. 3 illustrates an example network architecture 300 in which embodiments of the present disclosure can operate. The network architecture 300 may include a server 302 and multiple user devices 306 coupled to the server 302 via a network 304 (e.g., a public network such as the Internet, a private network such as a local area network (LAN), or a virtual private network (VPN)).

The user devices 306 are variously configured with different functionality to enable consumption of electronic documents such as e-books, newspaper articles, journal articles, magazine articles, and any other electronic documents including textual content. The user devices 306 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 302 provides electronic documents, upgrades, and/or other information to the user devices 306 registered with the server 302 via the network 304. The server 302 also receives various requests, instructions and other data from the user devices 306 via the network 304. The server 302 may include one or more machines (e.g., one or more server computer systems, routers, gateways) that have processing and storage capabilities to provide the above functionality.

Communication between the server 302 and a user device 306 may be enabled via any communication infrastructure. One example of such an infrastructure includes a combination of a wide area network (WAN) or a VPN and wireless infrastructure, which allows a user to use the user device 306 to purchase items and consume items without being tethered to the server 302 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 306. Yet alternatively, or in combination, the wireless infrastructure may be provided by an access point (e.g., WiFi access point) provider system.

The server 302 can include a document ingestion system 308 that facilitates conversion of printed publications received from various sources (e.g., book publishers, newspapers, etc.) into a device-readable format. As will be discussed in more detail below, the document ingestion system 308 may include a character identifying subsystem 310 that detects text characters in printed publications, and creates electronic documents containing the detected text characters. These electronic documents can be optionally further edited (e.g., by humans or using automated editing tools) and distributed to user devices 306.

Figure 4:
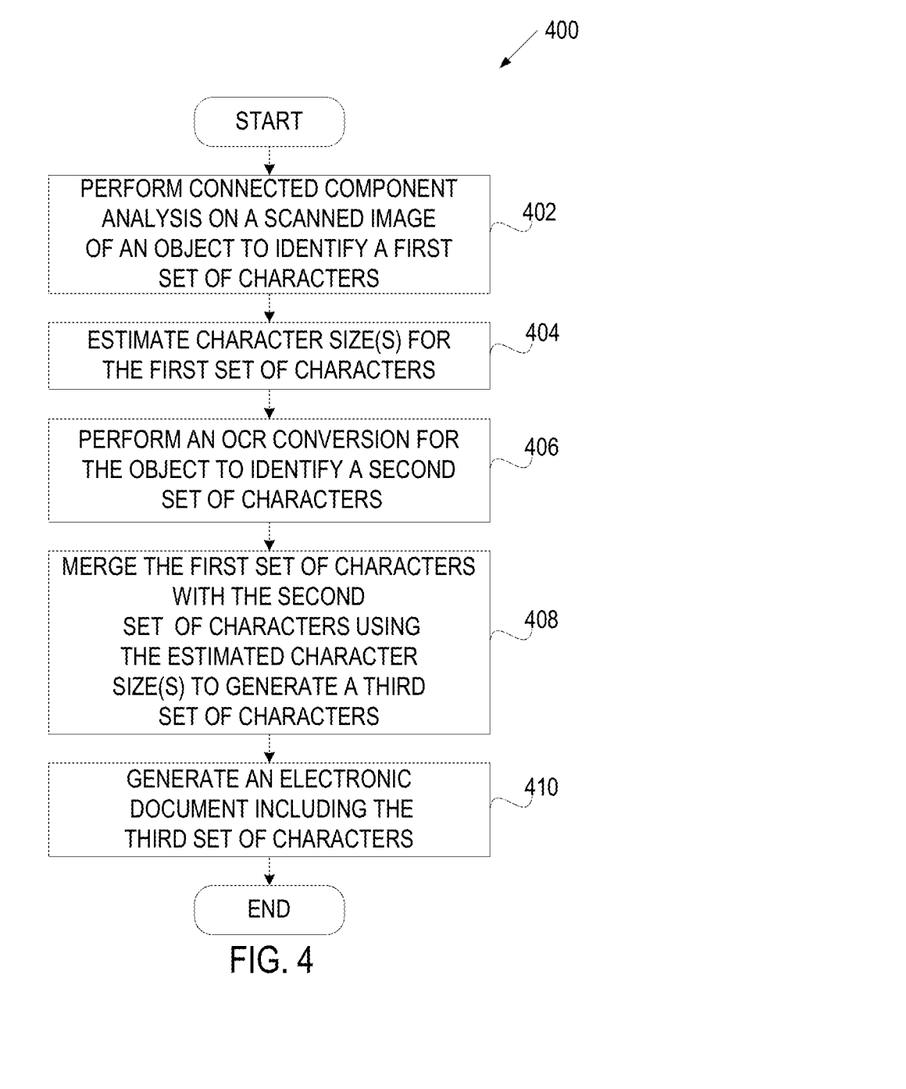
FIG. 4 is a flow diagram of one embodiment of a method for identifying characters in text using connected component analysis and grid layout analysis.

FIG. 4 is a flow diagram of one embodiment of a method 400 for identifying characters in text using connected component analysis and grid layout analysis. The method 400 is performed by processing logic that may comprise hardware (circuitry, dedicated logic, etc.), software (such as is run on a general purpose computer system or a dedicated machine), or a combination of both. In one embodiment, the method is performed by a server (e.g., character identifying subsystem 100 of FIG. 1 or character identifying subsystem 310 of FIG. 3).

Referring to FIG. 4, method 400 begins with the server performing connected component analysis on a scanned image of an object (block 402). The object can be a page of a printed publication. A scanned image of the page may be created using a scanner or any similar device capable of capturing images including but not limited to a video camera, digital camera, copier, scanning pen, etc. Performing the connected components analysis may include examining pixels in the scanned image to identify pixels that are connected by ink, combining each subset of connected pixels using respective bounds or bounding boxes, and storing the resulting set of characters ("first set of characters"). The server may store the first set of characters together with data identifying the bounds of the characters in the first set.

At block 404, the server estimates a character size for the first set of characters. In one embodiment, the server estimates a character size for each paragraph separately. Alternatively, the server estimates a character size for all paragraphs in the image. One embodiment of a method for estimating a character size will be discussed in more detail below in conjunction with FIG. 5.

At block 406, the server performs an OCR process on the image of the object and creates an OCR-based set of characters ("second set of characters") based on the OCR output. In an alternative embodiment, the OCR conversion is performed by an external system that provides the second set of characters to the server.

At block 408, the server merges the first set of characters with the second set of characters using the estimated character size(s), and generates a third set of characters. One embodiment of a method for merging both character sets using estimated character sizes will be discussed in more detail below in conjunction with FIG. 6. In an alternative embodiment, the server merges the first character set and the second character set without taking the estimated character size(s) into consideration, and generates the third set of characters based on the result. In this alternative embodiment, block 404 may not be performed.

At block 410, the server generates an electronic document containing the third set of characters. The electronic document may be an eBook that has a format understandable by various user devices (e.g., eBook readers).

In some embodiments, the server further determines bounding boxes of the characters in the third character set, provides the bounding boxes of the characters in the third set to the OCR subsystem, and instructs the OCR subsystem to perform a second pass on the image of the object using the new bounding information. The OCR subsystem can then perform the second OCR pass on the image using the new bounding information as additional hints for the correct bounds.

Figure 5:
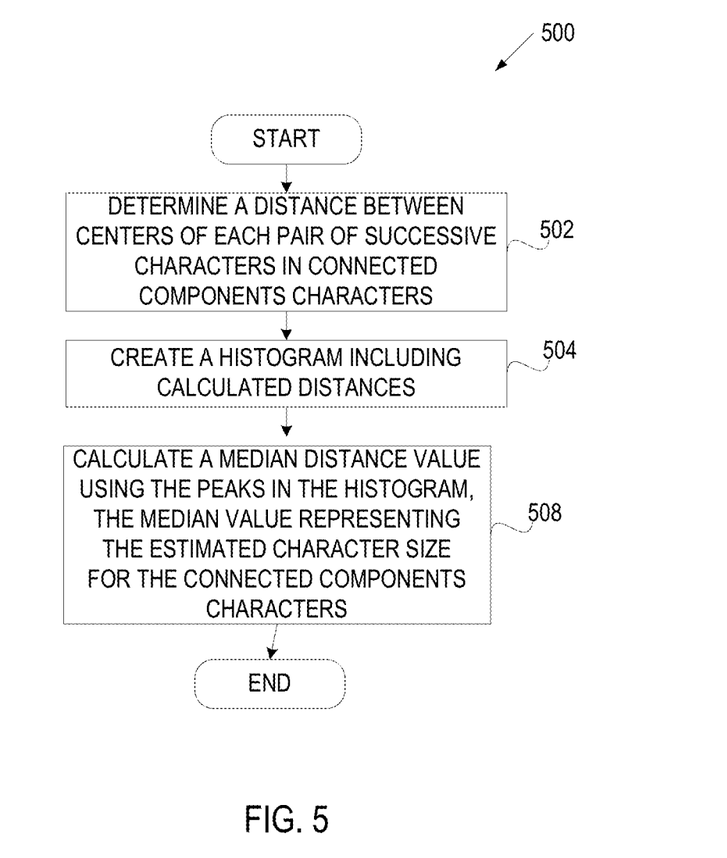
FIG. 5 is a flow diagram of one embodiment of a method for estimating a character size in text using grid layout analysis.

FIG. 5 is a flow diagram of one embodiment of a method 500 for estimating a character size in text using grid layout analysis. The method 500 is performed by processing logic that may comprise hardware (circuitry, dedicated logic, etc.), software (such as is run on a general purpose computer system or a dedicated machine), or a combination of both. In one embodiment, the method is performed by a server (e.g., character identifying subsystem 100 of FIG. 1 or character identifying subsystem 310 of FIG. 3).

Referring to FIG. 5, method 500 begins with the server determining a distance between centers of each pair of successive characters in a first set of characters created at block 402 of FIG. 4. In one embodiment, method 500 is performed separately for different paragraphs consecutively or in parallel. Alternatively, method 500 is performed for the entire first set of characters. In some embodiments, the server can measure distances using the direction of the orientation of the text in the paragraph being processed or the entire page.

At block 504, the server creates a histogram that holds the calculated distances (e.g., individual bins for different distances or distance ranges). Each peak in the histogram represents a frequency of occurrence of distance values that fall within a corresponding distance range. At block 508, the server calculates a median value of the distance values that fall within the distance ranges associated with the peaks in the histogram, where the median value represents the estimated character size for the paragraph being processed or for the entire first set of characters.

Figure 6:
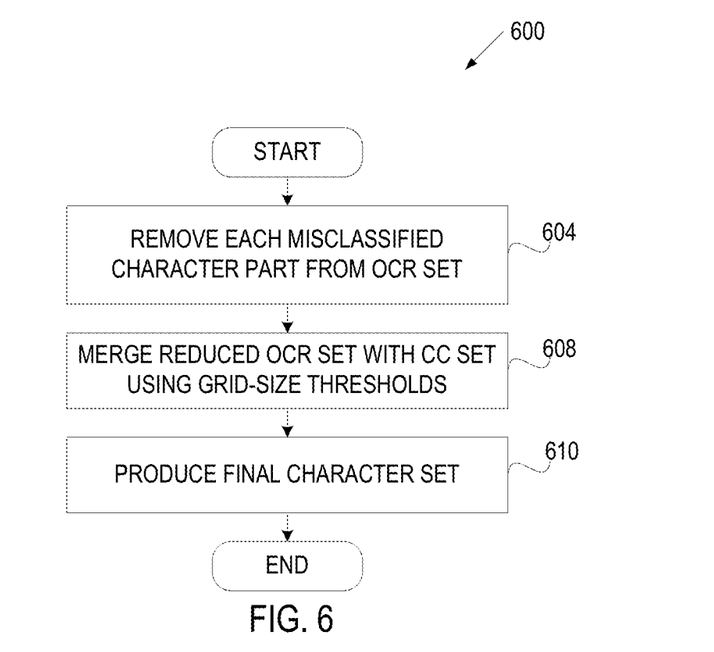
FIG. 6 is a flow diagram of one embodiment of a method for merging OCR characters and connected component characters.

FIG. 6 is a flow diagram of one embodiment of a method 600 for merging OCR characters and connected component characters. The method 600 is performed by processing logic that may comprise hardware (circuitry, dedicated logic, etc.), software (such as is run on a general purpose computer system or a dedicated machine), or a combination of both. In one embodiment, the method is performed by a server (e.g., font hinting subsystem 410 of FIG. 4).

Referring to FIG. 6, method 600 begins with the server identifying, in an OCR set of characters (e.g., a second character set created at block 406 of FIG. 4), each character that is inside any of the characters from a connected component (CC) character set (e.g., a first character set created at block 402 of FIG. 1) and is referred to herein as a misclassified character part. In particular, the server identifies such a misclassified character part when the server determines that this character component in the OCR set maps to a character in the CC character set and that the bounding box of this character component in the OCR set is inside the bounding box of the mapped character in the CC character set. The server then removes all misclassified character parts from the OCR set (block 604).

At block 608, the server merges the reduced OCR character set and the CC character set by determining, based on one or more thresholds, whether subsets of adjacent characters in the reduced OCR character set and the CC character set can be merged into a single character. For example, the server can perform merging by first mapping components in the reduced OCR character set to components in the CC character set based on their bound information. Next, the server can add, to a final letter set, each component in the reduced OCR character set that matches (e.g., exactly or closely) a component in the CC character set, and also adds, to the final letter set, the components from the reduced OCR character set and the CC character set that do not have a match in the other set. Further, the server can combine any 2 adjacent components in the final letter set into a single character if the distance between the 2 components is below a first fraction (e.g., 0.6) of the character size for a corresponding paragraph in the page, and/or the size of the resulting combined character is below a second fraction (e.g., 0.9) of the character size. The server can perform the combining operation iteratively adding a next adjacent component to the resulting combined character until the above conditions are no longer satisfied.

At block 610, the server produces the final letter set that result from merging the reduced OCR character set and the CC character set as discussed above.

In one embodiment, method 600 is performed separately for individual paragraphs consecutively or in parallel. Alternatively, method 600 is performed for the entire page. In some embodiments, the server can measure distances using the direction of the orientation of the text in the paragraph being processed or the entire page.

Figure 7:
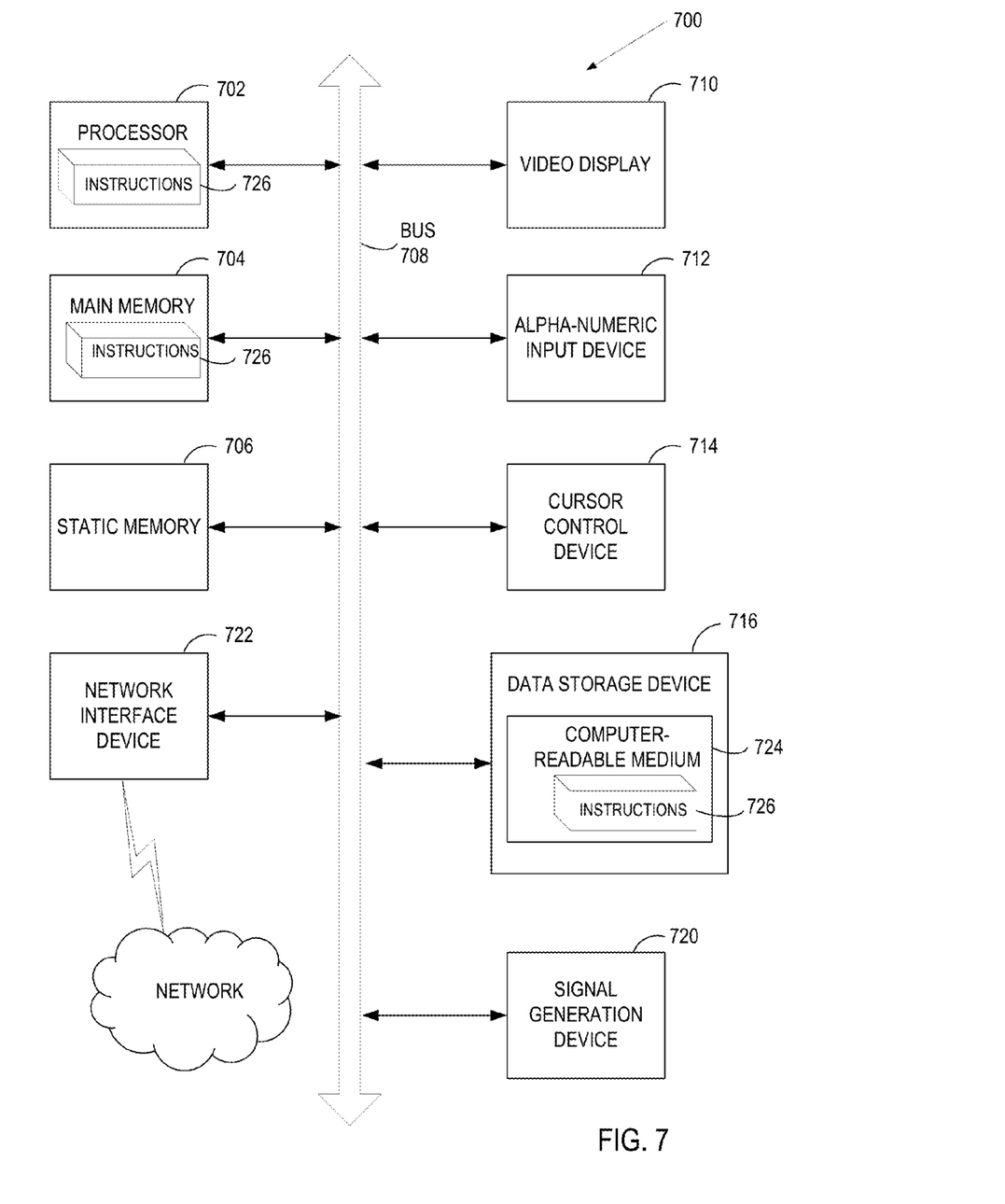
FIG. 7 illustrates an example server implementing a character identifying subsystem.

FIG. 7 illustrates an example server in the form of a computer system 700 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 706.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 of the character identifying subsystem 310 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

A drive unit 716 may include a computer-readable medium 724 on which is stored one or more sets of instructions (e.g., instructions 726 of the character identifying subsystem 310) embodying any one or more of the methodologies or functions described herein. The instructions 726 of the character identifying subsystem 310 may also reside, completely or at least partially, within the main memory 704 and/or within the processor 702 during execution thereof by the computer system 700, the main memory 704 and the processor 702 also constituting computer-readable media. The instructions 726 of the character identifying subsystem 310 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    performing, by a processing device, connected component analysis on a scanned image of an object comprising a plurality of characters, the connected component analysis identifying pixel connections in the image;
    identifying, by the processing device, a first set of characters in the image of the object based on the pixel connections;
    estimating, by the processing device, a character size for the first set of characters;
    performing, by the processing device, an optical character recognition (OCR) process on the image of the object to identify a second set of characters;
    merging, by the processing device, the first set of characters with the second set of characters based on the estimated character size to generate a third set of characters, the merging using one or more merging criteria, wherein the merging criteria comprises at least one of:
        a distance between two adjacent character components being below a first predetermined fraction of the estimated character size, or
        a size of a combined character component being below a second predetermined fraction of the estimated character size; and
    generating, by the processing device, an electronic document comprising the third set of characters.

2. The method of claim 1 wherein estimating the character size for the first set of characters comprises:
    determining a distance between centers of each pair of successive characters in the first set of characters;
    creating a histogram based on determined distances, the histogram comprising one or more peaks representing frequencies of occurrence of distance values that fall within one or more distance ranges; and calculating a median value of the distance values that fall within the one or more distance ranges associated with the one or more peaks, the median value representing the estimated character size for the first set of characters.

3. The method of claim 1 wherein merging the first set of characters with the second set of characters using the estimated character size comprises:

for each character component in the second set, determining whether the character component is an individual character or a misclassified character part, wherein the misclassified character part in the second set maps to a corresponding character component in the first set and a bounding box of the misclassified character part is inside a bounding box of the corresponding character component in the first set;

removing misclassified character parts from the second set to produce a reduced second set; and creating the third set from the reduced second set and the first set using the one or more merging criteria, wherein creating the third set comprises:

mapping character components in the reduced second set to character components in the first set based on bounding boxes of the character components in the reduced second set and bounding boxes of the character components in the first set;

adding, to the third set, each character component in the reduced second set that maps to a character component in the first set;

adding, to the third set, each character component in the reduced second set that does not map to a character component in the first set;

adding, to the third set, each character component in the first set that does not map to a character component in the reduced second set;

combining every two adjacent character components in the third set into a combined character component when the combined character component satisfies at least one of the one or more merging criteria; and iteratively performing the combining by adding a next adjacent character component in the third set to the combined character component until the combined character component no longer satisfies at least one of the one or more merging criteria.

4. The method of claim 1, wherein the distance is measured in a direction of an orientation of characters in the object.

5. A system comprising:

a memory; and a processing device operatively coupled to the memory, the processing device to:

identify a first set of characters in a scanned image of an object based on connected component analysis;

identify a second set of characters in the image of the object based on an optical character recognition (OCR) process on the object; and merge the first set of characters with the second set of characters based on a grid size associated with the scanned image to create a third set of characters, the merging using one or more merging criteria, wherein the merging criteria comprises at least one of: a distance between two adjacent characters in the third set being below a first predetermined fraction of the grid size, or a size of the combined character component being below a second predetermined fraction of the grid size.

6. The system of claim 5 wherein the processing device is further to determine the grid size by:

calculating a distance between centers of each pair of successive characters in the first set of characters;

creating a histogram based on calculated distances, the histogram comprising one or more peaks representing frequencies of occurrence of distance values that fall within one or more distance ranges; and calculating a median value of the distance values that fall within the one or more distance ranges associated with the one or more peaks in the histogram, the median value representing the grid size.

7. The system of claim 5 wherein the processing device is to identify the first set of characters in the scanned image based on the connected component analysis by combining a plurality of components connected via pixels in the image into a single character using a bounding box.

8. The system of claim 5 wherein the processing device is to merge the first set of characters with the second set of characters using the grid size by:

determining, for each character in the second set, whether the character is an individual character or a misclassified character part, wherein the misclassified character part in the second set maps to a corresponding character component in the first set and a bounding box of the misclassified character part is inside a bounding box of the corresponding character component in the first set;

removing misclassified character parts from the second set to produce a reduced second set; and creating the third set from the reduced second set and the first set using the one or more merging criteria, wherein creating the third set comprises:

mapping character components in the reduced second set to character components in the first set based on bounding boxes of the character components in the reduced second set and bounding boxes of the character components in the first set;

adding, to the third set, each character component in the reduced second set that maps to a character component in the first set;

adding, to the third set, each character component in the reduced second set that does not map to a character component in the first set;

adding, to the third set, each character component in the first set that does not map to a character component in the reduced second set;

combining every two adjacent character components in the third set into a combined character component when the combined character component satisfies at least one of the one or more merging criteria; and iteratively performing the combining by adding a next adjacent character component in the third set to the combined character component until the combined character component no longer satisfies at least one of the one or more merging criteria.

9. The system of claim 5, wherein the distance is measured in a direction of an orientation of characters in the object.

10. The system of claim 5 wherein the processing device is further to generate an electronic document comprising the third set.

11. The system of claim 5 wherein the processing device is further to:

determine a bounding box of each character in the third set;

provide data specifying bounding boxes of characters in the third set to an OCR subsystem; and instructing the OCR subsystem to repeat the OCR process on the image of the object using the bounding boxes of the characters in the third set.

12. A non-transitory computer-readable storage medium having stored therein instructions which, when executed by a processing device, cause the processing device to perform operations comprising:

performing a first optical character recognition (OCR) pass on an image of an object to create a first OCR set of characters, each character being associated with a respective bounding box;

modifying the first OCR set of characters based on connected component analysis to create a modified set of characters, wherein modifying the first OCR set of characters based on the connected component analysis comprises:

identifying a connected component set of characters in the image of the object based on the connected component analysis; and merging the first OCR set of characters with the connected component set of characters to produce the modified set of characters, the merging using one or more merging criteria, wherein the merging criteria comprises at least one of:

a distance between two adjacent characters in the modified set being below a first predetermined fraction of a grid size, or a size of the combined character component being below a second predetermined fraction of the grid size;

determining a bounding box associated with each character in the modified set;

performing a second OCR pass on the image of the object using data specifying determined bounding boxes associated with characters in the modified set to create a second OCR set of characters; and generating an electronic document comprising the second OCR set.

13. The computer-readable storage medium of claim 12 wherein identifying the connected component set of characters in the scanned image of the object comprises combining a plurality of components connected via pixels in the image into a single character using a bounding box.

14. The computer-readable storage medium of claim 12 wherein merging the first OCR set of characters with the connected component set of characters comprises:

determining, for each character in the first OCR set, whether the character is an individual character or a misclassified character part, wherein the misclassified character part in the first OCR set maps to a corresponding character component in the connected component set and a bounding box of the misclassified character part is inside a bounding box of the corresponding character component in the connected component set; and removing misclassified character parts from the first OCR set to produce a reduced OCR set.

15. The computer-readable storage medium of claim 14 wherein merging the first OCR set of characters with the connected component set of characters further comprises:

determining the grid size for the connected component set; and wherein creating the modified set comprises:

mapping character components in the reduced OCR set to character components in the connected component set based on bounding boxes of the character components in the reduced OCR set and bounding boxes of the character components in the connected component set;

adding, to the modified set, each character component in the reduced OCR set that maps to a character component in the connected component set;

adding, to the modified set, each character component in the reduced OCR set that does not map to a character component in the connected component set;

adding, to the modified set, each character component in the connected component set that does not map to a character component in the reduced OCR set;

combining every two adjacent character components in the modified set into a combined character component when the combined character component satisfies at least one of the one or more merging criteria; and iteratively performing the combining by adding a next adjacent character component in the modified set to the combined character component until the combined character component no longer satisfies at least one of the one or more merging criteria.

16. The computer-readable storage medium of claim 15 wherein determining the grid size for the connected component set comprises:

calculating a distance between centers of each pair of successive characters in the connected component set;

creating a histogram based on calculated distances, the histogram comprising one or more peaks representing frequencies of occurrence of distance values that fall within one or more distance ranges; and calculating a median value of the distance values that fall within the one or more distance ranges associated with the one or more peaks in the histogram, the median value representing the grid size.

17. The computer-readable storage medium of claim 12, wherein the distance is measured in a direction of an orientation of characters in the object.

* * * * *